United States Patent [19]
Read

[11] Patent Number: 5,388,887
[45] Date of Patent: Feb. 14, 1995

[54] BICYCLE SEAT INSERT

[75] Inventor: Robert Read, Orange, Calif.

[73] Assignee: Marie-Therese Chiarella, Lugano-Castagnola, Switzerland

[21] Appl. No.: 249,698

[22] Filed: May 26, 1994

Related U.S. Application Data

[63] Continuation of Ser. No. 967,518, Oct. 28, 1992, abandoned.

[51] Int. Cl.$^6$ ................................................ B60N 2/38
[52] U.S. Cl. ................................. 297/195.1; 297/214; 297/215
[58] Field of Search .................... 297/195.1, 204, 207, 297/214, 215

[56] References Cited

U.S. PATENT DOCUMENTS

| 468,998 | 2/1892 | McGlinchey | 297/215 X |
| 607,651 | 7/1898 | Blossom | 297/204 X |
| 2,085,569 | 6/1937 | Bloomberg | 297/214 X |
| 2,190,992 | 2/1940 | Mesinger | 297/214 |

FOREIGN PATENT DOCUMENTS

| 499010 | 2/1951 | Belgium | 297/214 |
| 827289 | 12/1951 | Germany | 297/214 |
| 274989 | 8/1927 | United Kingdom | 297/214 |

Primary Examiner—Laurie K. Cranmer
Attorney, Agent, or Firm—Darby & Darby

[57] ABSTRACT

A bicycle type seat having a shell, preferably resilient material or padding thereon, and a top cover on the resilient material or padding. The seat has a wide rear portion and a relatively narrow nose extending forward of the rear portion in a longitudinal direction. There is at least one reinforcing strut which extends longitudinally and is secured to the seat adjacent the nose and the rear portion.

There is provided a support which includes at least one tab and side portions. The side portions extend on the lower surface of the shell substantially corresponding to the shape of the rear portion of the seat. The tab extends from the side portions over the upper surface of the shell. A fitted portion of the top cover is located between the support and the shell whereby a clamping action is exerted thereon.

In manufacture, the support secures the rear portion of the top cover to the shell and permits the remainder of the top cover to be stretched forward and press-fitted around the rest of the shell. In addition, by suitable selection of the material of which the support is made, the degree of resilience of the finished seat can be predetermined.

18 Claims, 4 Drawing Sheets

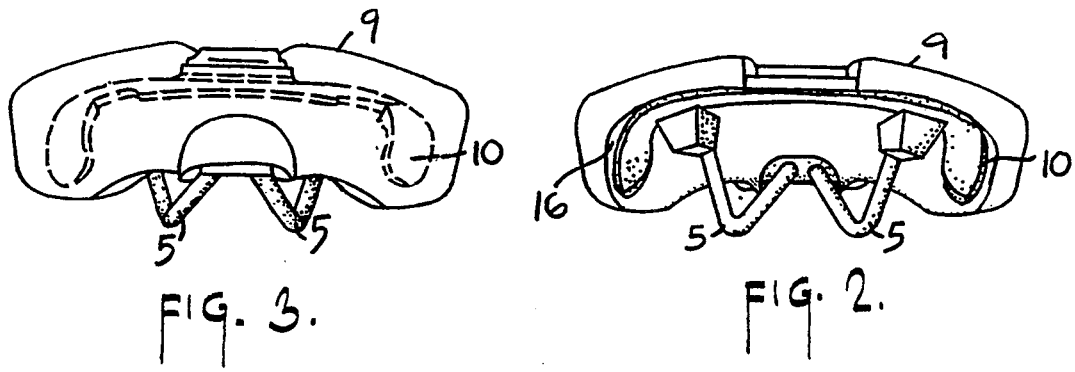
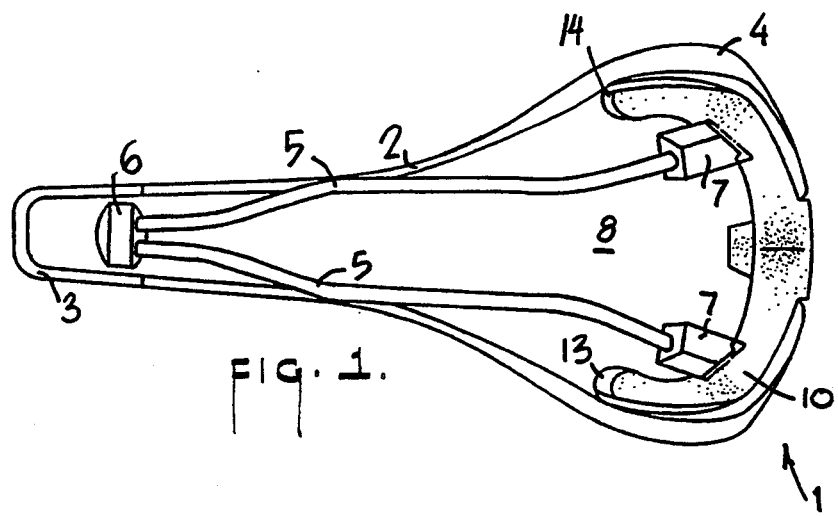
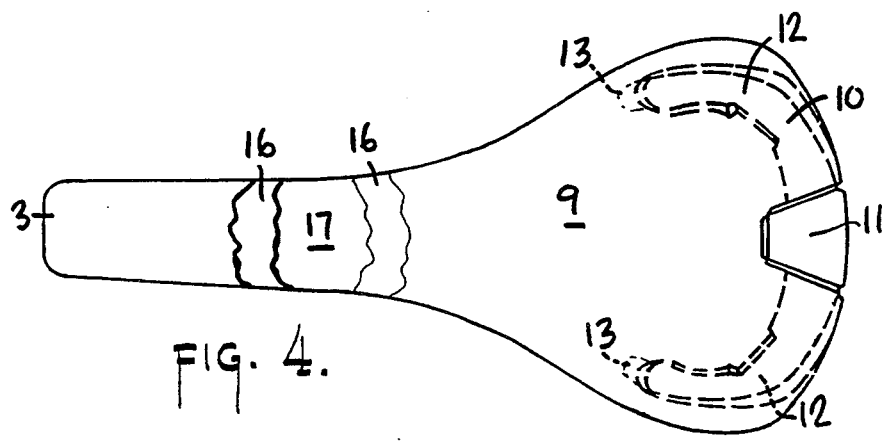

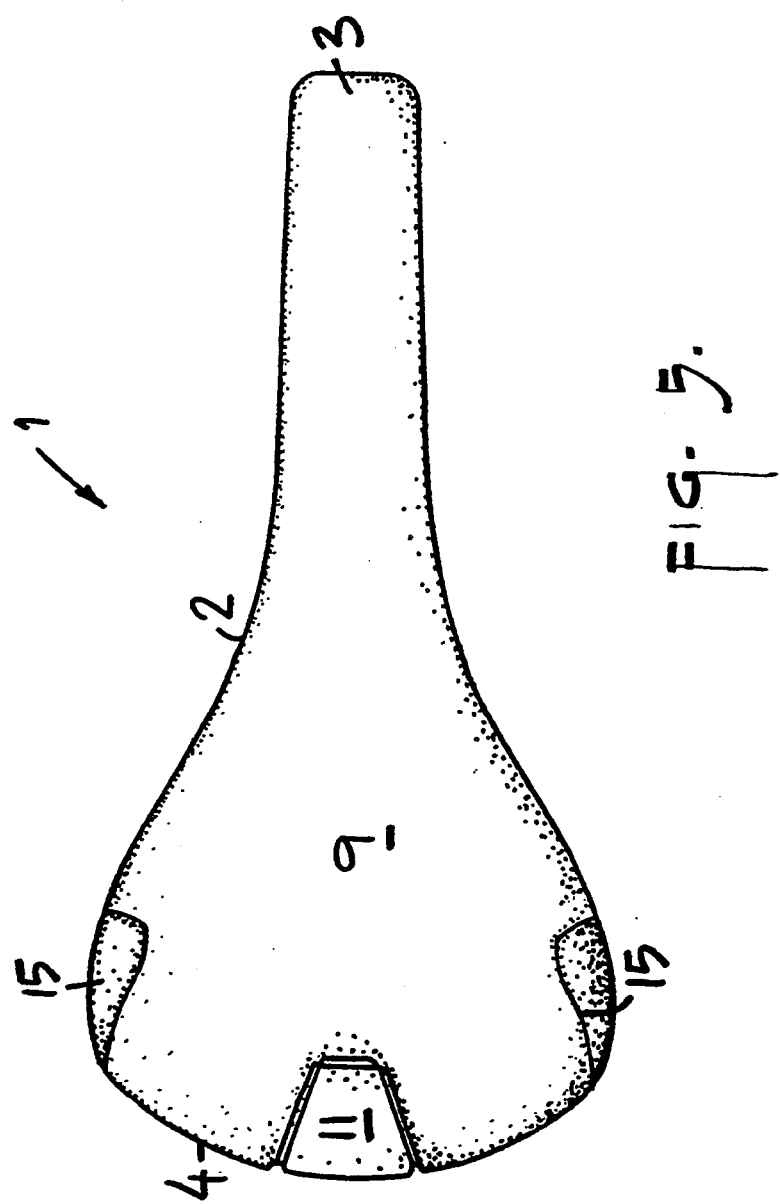

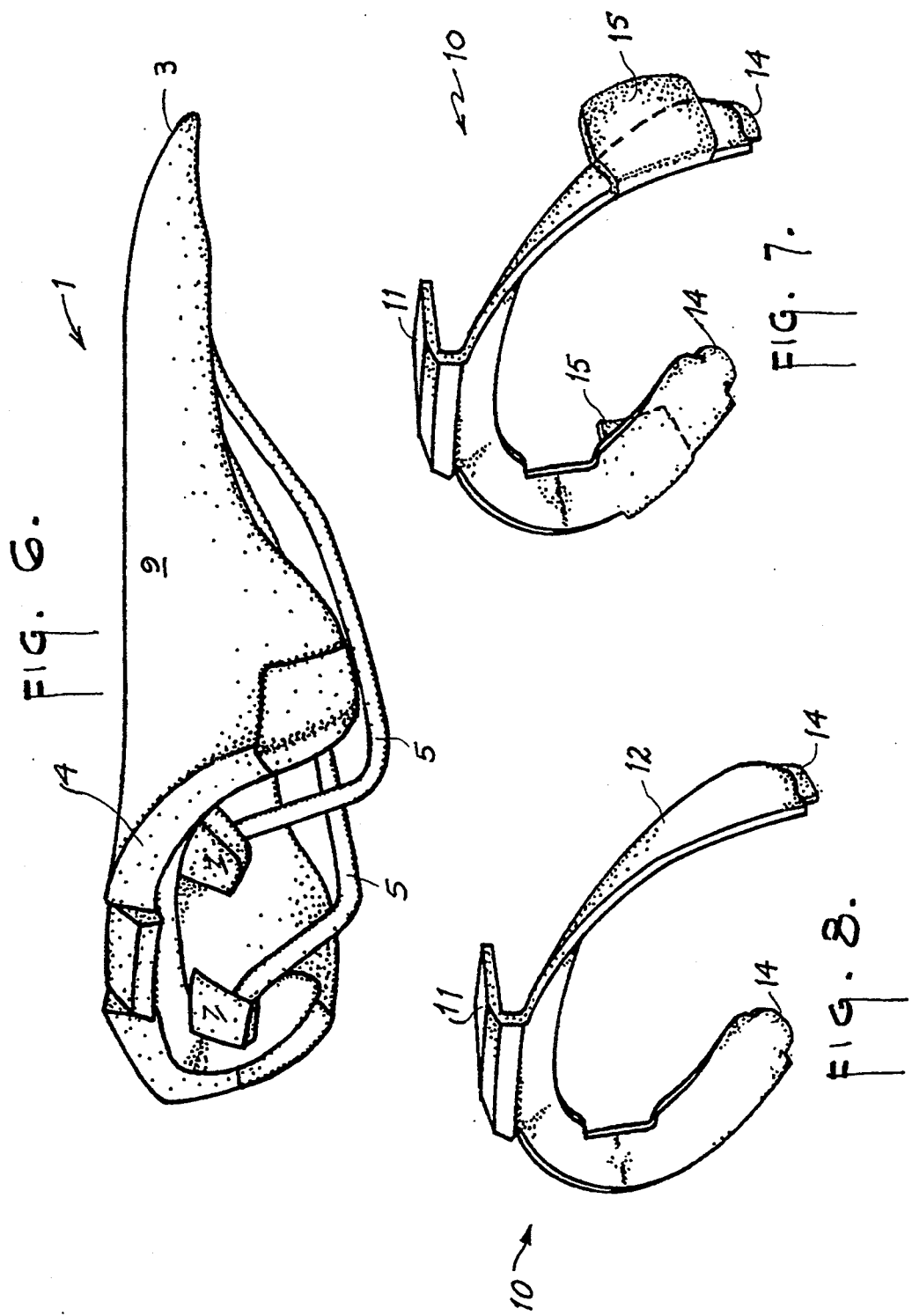

BICYCLE SEAT INSERT

This is a continuation of application Ser. No. 07/967,518, filed Oct. 28, 1992 abandoned.

The present invention is directed to improvements in bicycle type seats, the manufacture thereof, and the provision of flexibility in adjusting the stiffness of the finished product.

BACKGROUND OF THE INVENTION

Bicycle seats of the general character of those claimed herein have been known for some time. They comprise a shell, an outer surface thereon, resilient material or padding therebetween, and struts running longitudinally to brace the seat and provide a certain degree of flexibility. In the manufacture of seats of this type, the shell (usually of plastic) is formed, normally by injection molding. Thereafter, the resilient material, usually of foam or gel, is injection overmolded onto the upper surface of the shell and the combination placed in an assembly fixture. After being die cut to shape, the top cover is adhesive coated and partially fitted starting at the rear of the seat.

To complete the operation, it is necessary to stretch the top cover forward and pressure fit it in place. During this part of the manufacturing process, there is a danger that the portion of the top cover which has been fitted to the rear of the seat may come loose, thereby interfering with the proper application thereof to the remainder of the seat. Moreover, it is desirable to provide seats of different flexibilities, depending upon the use to which the seat is to be put, as well as the personal preference of the individual rider. For purposes of simplicity and economy, it is advantageous to be able to predetermine the flexibility of the finished seat by means which does not interfere with or alter the normal method of manufacture.

Bicycles are no longer equipped with devices such as kickstands for support when not being used; today, it is customary to lean them against a wall or other similar support. In doing so, the widest point of the bicycle seat (which usually contacts the wall) tends to become abraded. Thus, there is a need for some means for minimizing such wear.

BRIEF DESCRIPTION OF THE INVENTION

In order to overcome the foregoing disadvantages, the present invention provides the seat with a support comprising a tab and side portions. The side portions extend along the lower surface of the rear portion of the shell and the tab extends from the rear of the side portions over the upper surface of the shell. The portions of the top cover which are initially fitted adjacent the rear portion of the seat are located between the tab and the top surface of the shell and/or between the bottom surface of the shell and the side portions of the support. The side portions are adjacent and generally complementary to the rear and side edges of the seat. In this way, the support serves to clamp the rear fitted portions of the top cover in place and hold them while the remainder of the top cover is being stretched and press fit onto the forward portion of the seat. This eliminates the need for any additional fastening devices such as staples or external clamps.

Moreover, by suitably selecting the material of which the support is made, it is possible to determine the degree of stiffness or resilience of the seat itself. More particularly, if a flexible material is used for the support, then the seat will also be flexible. On the other hand, if greater stiffness is desired, the support is made of a stiffer material. It has been found that, in order of increasing stiffness, nylon, ABS, polycarbonate, and polycarbonate with carbon fibers constitute a particularly suitable group from which to select materials to make supports of different stiffnesses.

In addition, the support can be of a color which will contrast attractively with the color of the top cover. Thus, the present invention provides (1) an improvement in the manufacturing process, (2) the ability to vary the stiffness of the seat, (3) an attractive cosmetic appearance, and (4) a place for the display of a trademark or decoration. All of this can be accomplished without the necessity of the use of any fastening means such as rivets, screws, staples, etc.

In another embodiment of the present invention, a pair of protectors is located on each side of the seat at its widest point. These can be integrally molded as part of the support or separately mounted by independent means. In the latter case, when the protectors are worn so that their appearance is no longer acceptable, they can be replaced without replacing the entire seat. Here, too, decoration or a trademark can be displayed.

As a modification of the invention, the support can carry two tabs spaced apart along the curvature of the rear edge of the seat. This provides additional space for display and can attach the support to the remainder of the seat more securely. A further modification consists in the provision of pockets in the underside of the shell and complementary tongues on the ends of the support which are inserted therein. In this manner, both the rear portion of the support and the forward ends are well secured to the seat.

BRIEF DESCRIPTION OF THE DRAWINGS

In the accompanying drawings, constituting a part hereof, and in which like reference characters indicate like parts;

FIG. 1 is a bottom view of the bicycle seat of the present invention;

FIG. 2 is an elevation taken from the rear of the seat shown in FIG. 1;

FIG. 3 is a view similar to that of FIG. 2 taken from the front of the seat of FIG. 1;

FIG. 4 is a top plan view of the seat with the support in phantom lines;

FIG. 5 is a top plan view showing the protectors;

FIG. 6 is a perspective view of the bicycle seat of FIG. 5;

FIG. 7 is a perspective view of the form of the support wherein the protectors are integral therewith;

FIG. 8 is a view, similar to that of FIG. 7 wherein the support does not have protectors.

DETAILED DESCRIPTION OF THE INVENTION

Figure 9:
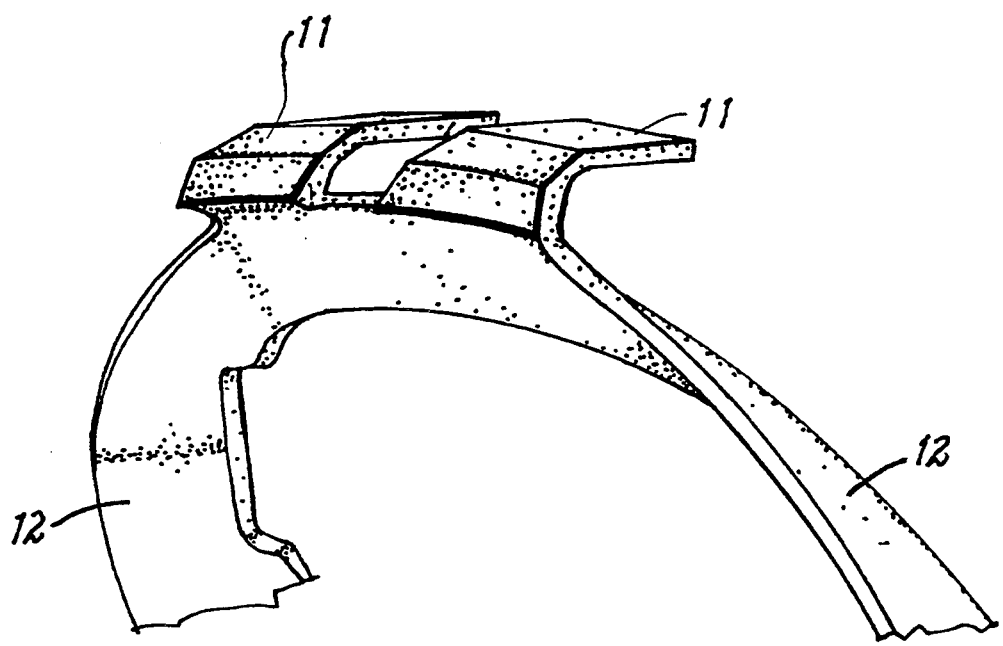
FIG. 9 is a view showing a pair of tabs on the support.

Seat 1 comprises saddle 2 which connects nose 3 and rear portion 4. Struts 5 are substantially longitudinal of seat 1 and have their forward ends secured in forward detent 6 and their rearward ends secured in rear detents 7.

The basic portion of the seat is shell 8 which is formed of a suitable material having a desired degree of flexibility and resilience. In the preferred form of the invention, resilient material 16 (see FIG. 4) is located on top of shell 8. Over all is top cover 9 which is substantially impervious to weather.

An important feature of the present invention is support 10. It comprises wings 12, which are located on the underside of seat 1, and tab 11 which extends from wings 12 and overlies the upper surface of shell 8. A portion of outer surface 9 extends around rear portion 4 and is located between wings 12 and the underside of shell 8. Also, tab 11 extends from the underside of shell 8 and overlies the upper surface of shell 8 and a portion of top cover 9, whereby cover 9 is clamped between wings 12 and the underside of shell 8 and/or between tab 11 and the upper surface of shell 8.

Tongues 14 on the ends of wings 12 are inserted into retaining pockets 13 and are secured to seat 1 thereby. In a preferred form of the invention, protectors 15 are provided on the widest portion of seat 1. In one embodiment of the Invention, protectors 15 are molded integrally with wings 12 of support 10. Alternatively, protectors 15 can be independently attached to seat 1 in any convenient manner. The advantage of the latter is that, if protectors 15 were to become scuffed or abraded, they can be readily replaced.

In producing seat 1, shell 8 is formed in the usual shape. While this is not essential to the invention, it is by far preferable to place some form of resilient material 16 on upper surface 17 of shell 8. The two layers are placed in an assembly fixture and outer surface 9 is generally fitted to seat 1 in the area of rear portion 4. Thereafter, support 10 is placed in position so that portions of top cover 9 are clamped between it and shell 8. This serves to hold outer surface 9 securely to shell 8 and permits the remainder of outer surface 9 to be pulled and stretched forward in the direction of nose 3 so that a tight smooth surface is obtained. Pressure is applied in order to complete the fitting of top cover 9.

In a modification of the device, two tabs 11 are provided on support 10 spaced apart equally from the midline thereof. This can provide a more secure grip and permit the device to withstand greater forces.

While only a limited number of specific embodiments of the present invention have been expressly disclosed, it is, nonetheless, to be broadly construed and not to be limited except by the character of the claims appended hereto.

What we claim is:

1. A bicycle type seat comprising:
   a shell having an upper surface, a lower surface, a periphery, a wide rear portion with an upper surface, rear edge and side edges, and a relatively narrow nose extending forward of said rear portion in a longitudinal direction,
   a cover overlying said shell upper surface and fitting around the shell periphery;
   a support comprising a substantially crescent shaped portion and at least one tab, wherein said at least one tab extends upwardly from and between oppositely directed side portions of said substantially crescent shaped portion, said substantially crescent shaped portion lying adjacent said shell lower surface and complementary to at least said shell rear edge, said at least one tab press fit over a portion of said shell wide rear portion upper surface and the cover thereon such that said support exerts a clamping action on a portion of said top cover; and means for attaching said support to said shell.

2. The seat of claim 1 wherein resilient material is located between said shell and said cover.

3. The seat of claim 1 wherein said at least one tab comprises two spaced tabs.

4. The seat of claim 1 wherein said side portions are adjacent said shell side edges and extend in a complementary direction thereto.

5. The seat of claim 1 wherein at least one of said side portions has means to engage with mating means on said lower surface for securing said support to said shell lower surface.

6. The seat of claim 5 wherein each of said side portions has means to engage with mating means on said shell lower surface.

7. The seat of claim 6 wherein said mating means comprise two pockets on said lower surface, each said side portion having a tongue for insertion into one said pocket.

8. The seat of claim 7 wherein said support is of resilient material and is deformed to insert said tongues into said pockets.

9. The seat of claim 5 wherein said mating means comprise a pocket on said shell lower surface and a tongue on a side portion for insertion into said pocket.

10. The seat of claim 9 wherein said support is of resilient material and is deformed to insert said tongue into said pocket.

11. The seat of claim 1 wherein said support side portions extend adjacent at least one of said shell side edges and further comprising a protector piece extending upwardly from a support side portion to overlie the cover on a corresponding shell side edge.

12. The seat of claim 11 wherein said support side portions extend adjacent said shell side edges and further comprising a pair of protector pieces one of said pair extending upwardly from each of said support side portions to overlie the cover on each of said side edges.

13. The seat of claim 12 wherein said protector pieces are replaceable.

14. The seat of claim 11 wherein said protector piece is integral with said support.

15. The seat of claim 12 wherein said protector pieces are integral with said support.

16. The seat of claim 11 wherein said protector piece is replaceable.

17. The seat of claim 1 wherein the stiffness of the support material is selected to control the stiffness of said seat.

18. The seat of claim 1 wherein said support is of a material selected from the group consisting of nylon, ABS, polycarbonate, and carbon fiber composite.

* * * * *